United States Patent
Wang et al.

(10) Patent No.: US 9,491,017 B1
(45) Date of Patent: Nov. 8, 2016

(54) CIRCUIT AND METHOD FOR IMPROVING PHASE DETECTION

(71) Applicant: Beken Corporation, Shanghai (CN)

(72) Inventors: Weifeng Wang, Shanghai (CN); Yiming Huang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 14/848,354

(22) Filed: Sep. 9, 2015

(30) Foreign Application Priority Data

Aug. 10, 2015 (CN) .......................... 2015 1 0487414

(51) Int. Cl.
 H04L 27/22 (2006.01)
 H04L 27/18 (2006.01)
 H04B 10/556 (2013.01)

(52) U.S. Cl.
 CPC ............. *H04L 27/22* (2013.01); *H04B 10/556* (2013.01); *H04L 27/18* (2013.01)

(58) Field of Classification Search
 CPC ............................... H04L 27/22; H04L 27/18
 See application file for complete search history.

(56) References Cited

U.S. PATENT DOCUMENTS

| 5,278,871 | A * | 1/1994 | Rasky | H03M 13/00 375/285 |
| 5,838,737 | A * | 11/1998 | Yamaguchi | H04L 27/2332 329/304 |
| 8,208,585 | B2 * | 6/2012 | Qi | H04L 25/067 375/324 |
| 2005/0207519 | A1 * | 9/2005 | Phang | H04L 27/2278 375/354 |

* cited by examiner

*Primary Examiner* — Sophia Vlahos
(74) *Attorney, Agent, or Firm* — Perkins Coie LLP (57) ABSTRACT

A circuit comprises a decision unit configured to obtain a plurality of decision errors based on a demodulated signal and an original symbol; a calculator configured to calculate an instant direct current error based on the plurality of the decision errors, and first and second variance error signals based on the instant direct current error; an error detector configured to obtain a first result by determining whether an absolute value of both the first variance error signal and an the second variance error signal are larger than a first threshold; obtain a second result by determining whether an absolute value of a first decision error of the plurality of the decision error is larger than a second threshold; and output a second closest constellation point as a corrected symbol corresponding to the first decision error at least based on the first result and the second result.

10 Claims, 5 Drawing Sheets

CIRCUIT AND METHOD FOR IMPROVING PHASE DETECTION

CROSS REFERENCE TO RELATED APPLICATION

This application claims priority to Chinese Application No. 201510487414.6 entitled "Circuit and Method for Improving Phase Detection," filed on Aug. 10, 2015 by Beken Corporation, which is incorporated herein by reference.

TECHNICAL FIELD

The present application relates to circuits, and more particularly but not exclusively to a circuit and method for improving phase detection.

BACKGROUND

A conventional differential phase shift keying (DPSK) receiver may have a poor sensitivity. Therefore it may be hard for the receiver to retrieve received data in poor channel conditions.

SUMMARY OF THE INVENTION

According to an embodiment of the invention, a circuit comprises a decision unit, configured to obtain a plurality of decision errors, based on a demodulated signal and an original symbol; a calculator configured to calculate an instant direct current error based on the plurality of the decision errors; calculate a first variance error signal and a second variance error signal based on the instant direct current error; an error detector configured to obtain a first result by determining whether both an absolute value of the first variance error signal and an absolute value of the second variance error signal are larger than a first threshold; obtain a second result by determining whether a first decision error of the plurality of the decision error is larger than a second threshold; and output a second closest constellation point as a corrected symbol corresponding to the first decision error at least based on the first result and the second result.

According to an embodiment of the invention, a method comprises obtaining a plurality of decision errors, based on a demodulated signal and an original symbol obtained from a symbol deciding unit; calculating an instant direct current error based on the plurality of the decision errors; calculating a first variance error signal and a second variance error signal based on the instant direct current error; obtaining a first result by determining whether both an absolute value of the first variance error signal and an absolute value of the second variance error signal are larger than a first threshold; obtaining a second result by determining whether a first decision error of the plurality of the decision error is larger than a second threshold; and outputting a second closest constellation point as a corrected symbol corresponding to the first decision error at least based on the first result and the second result.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
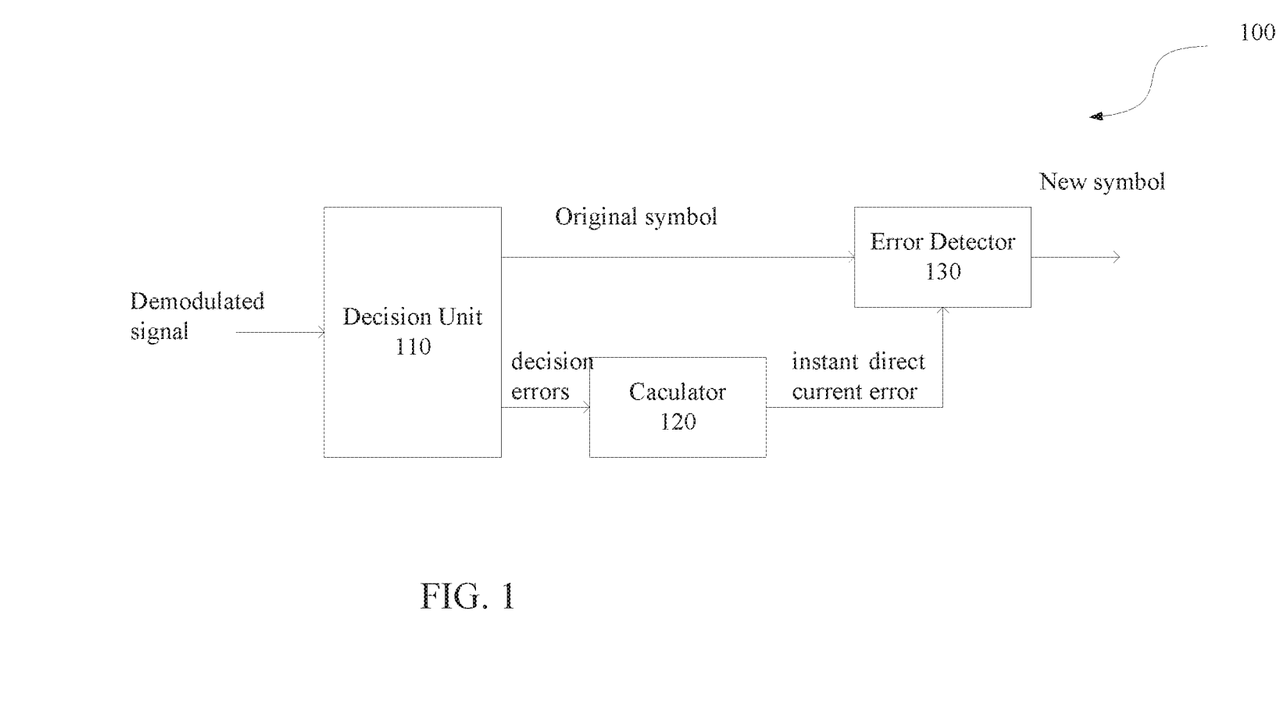
FIG. 1 is a block diagram illustrating an embodiment of a device for making decisions based on phase errors.

FIG. 1 is a block diagram illustrating an embodiment of a circuit 100 for detecting phases. The circuit 100 comprises a decision unit 110, a calculator 120 and an error detector 130. The decision unit 110 is connected to both the calculator 12o and the error detector 130, and the calculator 120 is connected to the error detector 130.

The decision unit obtains a plurality of decision errors 'quan_err3_vec(k), k=0, 1, 2 . . . n,' based on a demodulated signal and an original symbol. The demodulated signal may be represented as 'S,' and the original symbol may be represented as 'X'. The demodulated signal S can be the input of the decision unit 110, and the original symbol 'X' may be the output of the decision unit 110. In other words, the original symbol 'X' is a symbol after symbol decision based on the demodulated signal 'S'. The details for obtaining the plurality of decision errors will be discussed below with reference to FIG. 2 and FIG. 3. In the above and following description, 'quan' represents a quantized value.

The calculator 120 calculates an instant direct current error 'err_dc' based on the plurality of the decision errors 'quan_err3_vec(k), k=0, 1, 2 . . . n,' and calculates a first variance error signal 'quan_err2' and a second variance error signal 'quan_err21' based on the instant direct current error 'err_dc'.

The error detector 130 obtains a first result by determining whether both an absolute value of the first variance error signal 'abs(quan_err2)' and an absolute value of the second variance error signal 'abs(quan_err22)' are larger than a first threshold THD1, and obtains a second result by determining whether an absolute value of the first decision error 'abs(quan_err3_vec(k))' of the plurality of the decision errors 'quan_err3_vec(k), k=0, 1, 2 . . . n' is larger than a second threshold 'THD2;' and outputs a second closest constellation point 'X*' as a corrected symbol instead of the original symbol 'X' corresponding to the first decision error 'quan_err3_vec(k)' at least based on the first result and the second result.

Figure 2:
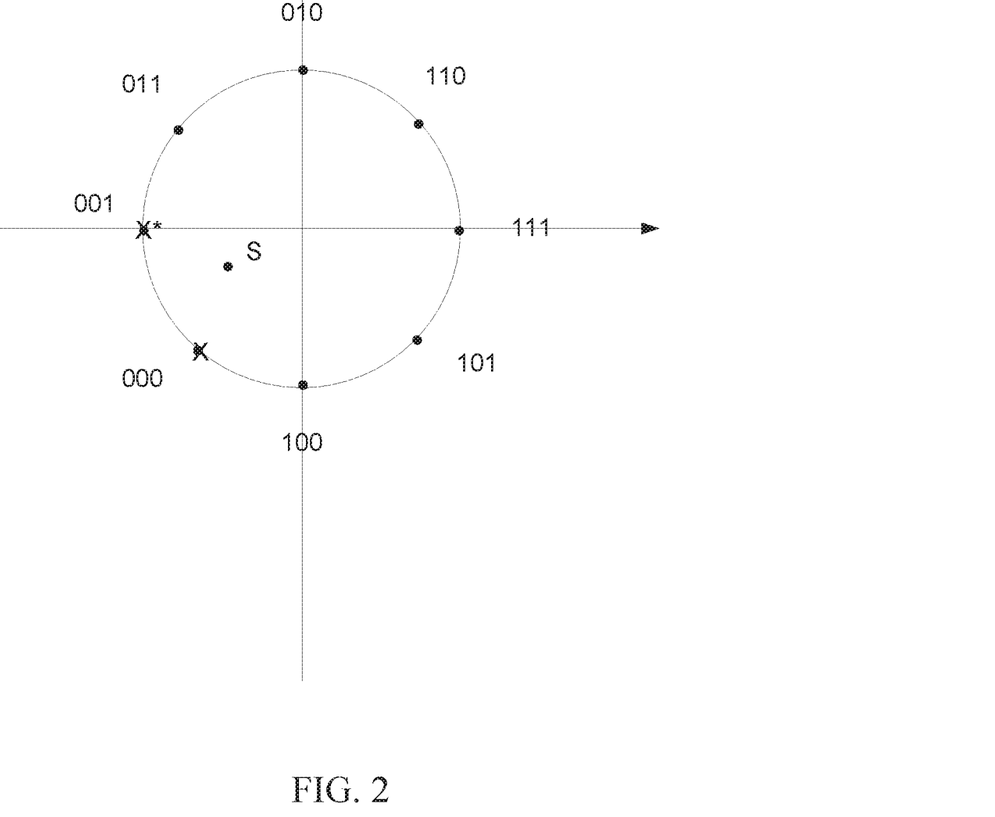
FIG. 2 is a constellation diagram for 8-point DPSK according to an embodiment of the invention.

Referring to FIG. 2, the original symbol 'X' is a point on the constellation diagram which is previously decided as the closest constellation point to the demodulated signal S. The second closest point 'X*' is a point on the constellation diagram which is previously decided as the second to the closest constellation point to the demodulated signal S.

FIG. 2 is a constellation diagram for an 8-point DPSK according to an embodiment of the invention. 'S' represents the demodulated signal. The error detector 130 originally decides the demodulated signal 'S' to be an original symbol 000, which is also represented as 'X', wherein the original symbol 000 is the previously decided closest constellation point to the demodulated signal S in an Euclidean distance sense, and the second closest constellation point to the demodulated signal S in an Euclidean distance sense is 001, which is also represented as 'X*'. Based on the first result and the second result, the error detector 130 outputs the second closest constellation point 001, that is, 'X*', as the corrected symbol instead of the original symbol X, which is 000. Note the second closest constellation point is stored in the memory. The Euclidean distance of a constellation points is determined based on the distance between the constellation point and the demodulated signal S. Thus the closest constellation point and the second closest constellation point are determined accordingly initially.

For example, the error detector 130 is further configured to output the second closest constellation point 'X*' or 001 as the corrected symbol corresponding to the first decision error if all of the following conditions are satisfied:

a) the absolute value of the first variance error signal 'abs(quan_err2)' is larger than the first threshold THD1;

b) the absolute value of the second variance error signal 'abs(quan_err21)' is larger than the first threshold THD1; and c) an absolute value of the first decision error 'abs(quan_err3_vec(k))' is larger than the second threshold THD2.

In some embodiments, Bluetooth applications may have two enhanced data rate (EDR) DPSK modulations. One is type 2, which uses the pi/4 DQPSK, wherein pi represents $\pi$, and the other is type 3, which uses the 8DPSK. The setting for the above THD1, THD2 and THD3 may be different. The typical value for type 2: THD1=0.4; THD2=0.7. Alternatively, the typical value for type 3 is: THD1=0.2; THD2=0.35. Note the values for the thresholds may be varied according to actual application.

In the above conditions, condition a) and condition b) are to determine whether instant variances of the error signal, one for the past, for example, 'abs(quan_err2),' and one for the future, for example, 'abs(quan_err21)' are larger than a first threshold THD1. If the original symbol 'X' is decided correctly, then either or both of 'abs(quan_err2)' and 'abs(quan_err21)' are smaller than the first threshold THD1. If only one of conditions a) and b) is satisfied, then the current symbol is correct, which means there may be a transition in the symbols. The first two conditions a) and b) are both satisfied means that both a past instant variance of the error signal and a future instant variance of the error signal are larger than the first threshold THD1, and the current error signal is unstable, for example, instantaneous, and varies from the average.

With the above determination, the sensitivity may be improved by 1 dB, or in other words, the distance within which the receiver may correctly receive and decode signals may be extended.

The above embodiments utilize error characteristics and the statistic rules of demodulated signals, to improve error detection and correction in the receiver.

Alternatively, in addition to the above three determining conditions, the error detector 130 further considers a fourth and a fifth conditions. For example, the calculator 120 is further configured to calculate a first difference between the first decision error 'quan_err3_vec(k)' and a next decision error 'quan_err3_vec(k+1)' of the first decision error 'quan_err3_vec(k),' and calculate a second difference between the first decision error 'quan_err3_vec(k)' and a previous error 'quan_err3_vec(k−1)' of the first decision error 'quan_err3_vec(k).' The error detector 130 is further configured to determine whether both the first difference 'quan_err3_vec(k)−quan_err3_vec(k+1)' and the second difference 'quan_err3_vec(k−1)−quan_err3_vec(k)' are smaller than a third threshold THD3; and output the second closest constellation point '001' or 'X*' as the corrected symbol corresponding to the first decision error 'quan_err3_vec(k)' if all of the following conditions are satisfied:

a) the absolute value of the first variance error signal 'abs(quan_err2)' is larger than the first threshold 'THD1;' b) the absolute value of the second variance error signal 'abs(quan_err21)' is larger than the first threshold 'THD1,' c) an absolute value of the first decision error 'abs(quan_err3_vec(k))' is larger than the second threshold 'THD2', d) the first difference 'quan_err3_vec(k)−quan_err3_vec(k+1)' is smaller than the third threshold 'THD3;' and e) the second difference 'quan_err3_vec(k−1)−quan_err3_vec(k)' is smaller than the third threshold 'THD3.'

In some embodiments, Bluetooth applications may have two enhanced data rate (EDR) DPSK modulations. One is type 2, which uses the pi/4 DQPSK, wherein pi represents $\pi$, and the other is type 3, which uses the 8DPSK. The setting for the above THD1, THD2 and THD3 may be different. The typical value for type 2: THD1=0.4; THD2=0.7; THD3=1.4. Alternatively, the typical value for type 3 is: THD1=0.2; THD2=0.35; THD3=0.7. Note the values for the thresholds THD1, THD2 and/or THD3 may be varied according to actual application including Bluetooth system, WIFI system, etc.

With the above determination for a)-e) conditions, the sensitivity may be improved by 2-3 dB, or in other words, the distance within which the receiver may correctly receive and decode signals may be extended to 1.5 times of the original distance without using embodiments of the invention. In an embodiment, the sensitivity may be improved for 2 dB for Bluetooth EDR mode.

Although the above determination may introduce some delays, the delays are neglected in the system. A delay introduced by determination may last only one symbol, in other words, last for 1 us for a Bluetooth system. A standard transmission time in Bluetooth standard system may exceed 200 us. Therefore, the delay introduced by determination may not significantly affect the system.

Figure 3:
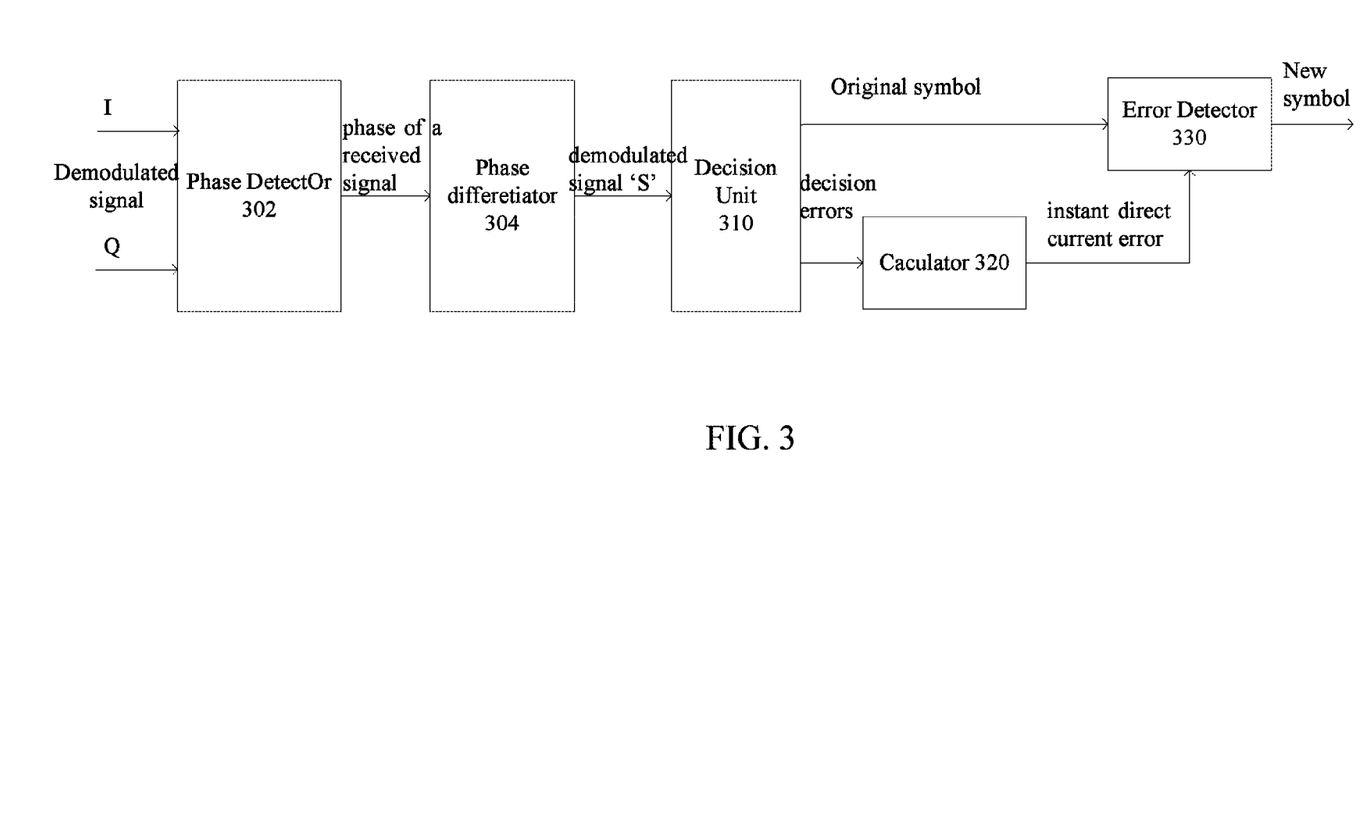
FIG. 3 is a block diagram illustrating another embodiment of a device for making decisions based on phase errors.

FIG. 3 is a block diagram illustrating another embodiment of a device for making decisions based on phase errors. As shown in FIG. 3, alternatively, the circuit further comprises a phase detector 302, a phase differentiator 304, a decision unit 310, a calculator 320 and an error detector 330. The phase detector 302 is configured to detect a phase of a received signal. The phase differentiator 304 is configured to obtain the demodulated signal 'S' by calculating a phase difference of the received signal with respect to a phase of a previous signal; and the decision unit 310 is further configured to decide the original symbol based on the demodulated signal. As show in FIG. 3, the phase detector 302 is connected to the phase differentiator 304. The phase differentiator 304 is connected to the decision unit 310. The decision unit 310 is connected to both the calculator 320 and the error detector 330. The calculator 320 is also connected to the error detector 330.

In an embodiment, the calculator 320 is further configured to calculate the instant direct current error based on the plurality of the decision errors by averaging the plurality of the decision errors 'quan_err3_vec(k), k=0, 1, 2 . . . n,' for example, err_dc=mean(quan_err4 vec(k−15:k)). Wherein quan_err4 vec(k−15:k) represents averaging 16 decision errors, from 'quan_err4 vec(k−15),' 'quan_err4 vec(k−14),' 'quan_err4_vec(k−13),' 'quan_err4 vec(k−12),' 'quan_err4 vec(k).' In addition, if there is not enough sample points initially, for example, less than 16, all past sample may be used to do average operation. Note the number of decision errors that are averaged may be varied. For example, 8 decision errors, 32 decision errors, etc., may be averaged to obtain the instant direct current error. Further, although the instant direct current error 'err_dc' is an average value, as the variable k changes, the instant direct current error 'err_dc' is updated constantly by averaging different decision errors, and reflects the instant direct current error.

In an embodiment, the calculator 320 is further configured to calculate a first average of the first decision error and a previous error of the first decision error, that is '(quan_err3 vec(k−1)+quan_err3 vec(k))/2'. Then the calculator 320 obtains the first variance error signal 'quan_err2' by calculating an absolute difference between the first average and the instant direct current error, that is, 'quan_err2=(quan_err3 vec(k−1)+quan_err3 vec(k))/2−err_dc.' The calculator 320 further calculates a second average of the first decision error 'quan_err3 vec(k)' and a next error 'of the first decision error, that is '(quan_err3 vec(k)+quan_err3 vec(k+1))/2'; and obtains the second variance error signal 'quan_err21' by calculating a difference between the second average and the instant direct current error, that is, quan_err21=(quan_err3 vec(k)+quan_err3 vec(k+1))/2−err_dc.

Figure 4:
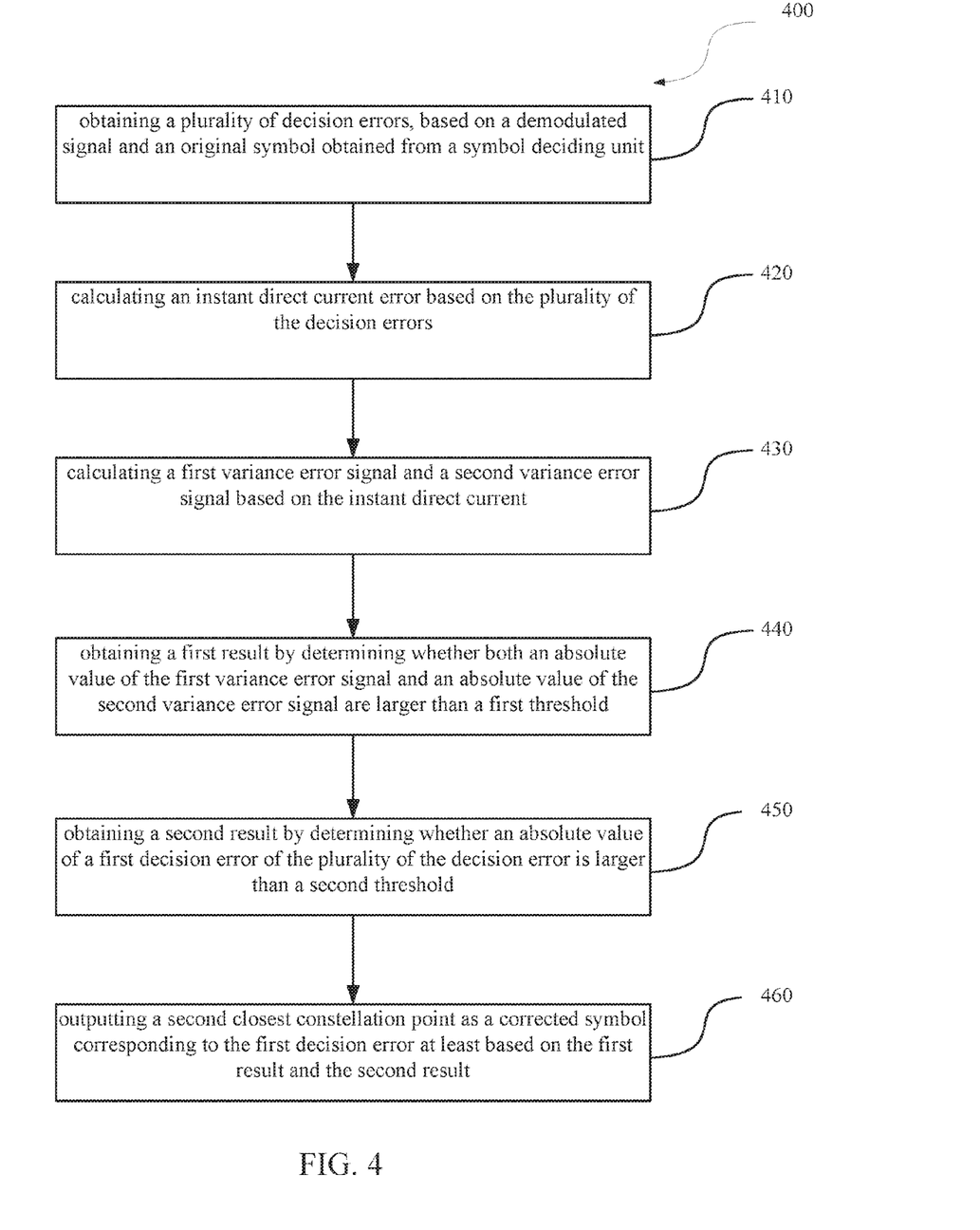
FIG. 4 is a flow chart of a method of making decisions based on phase errors.

FIG. 4 is a flow chart of a method 400 of making decisions based on phase errors.

The method 400 comprises, obtaining, in block 410, a plurality of decision errors 'quan_err3_vec(k), k=0, 1, 2 . . . n,' based on a demodulated signal 'S' and an original symbol 'X' obtained from a symbol deciding unit; calculating, in block 420, an instant direct current error 'err_dc' based on the plurality of the decision errors 'quan_err3_vec (k), k=0, 1, 2 . . . n'; calculating, in block 430, a first variance error signal 'quan_err2' and a second variance error signal 'quan_err21' based on the instant direct current error 'err_dc'; obtaining, in block 440, a first result by determining whether both an absolute value of the first variance error signal 'abs(quan_err2)' and an absolute value of the second variance error signal 'abs(quan_err22)' are larger than a first threshold THD1; obtaining, in block 450, a second result by determining whether an absolute value of a first decision error 'abs(quan_err3_vec(k))' of the plurality of the decision error 'quan_err3_vec(k), k=0, 1, 2 . . . n' is larger than a second threshold 'THD2,' and outputting, in block 450, a second closest constellation point 'X*' as a corrected symbol corresponding to the first decision error at least based on the first result and the second result.

Alternatively, outputting the second closest constellation point 'X*' as the corrected symbol further comprises outputting the second closest constellation point as the corrected symbol corresponding to the first decision error if both the absolute value of the first variance error signal 'abs(quan_err2)' and the absolute value of the second variance error signal 'abs(quan_err22)' are larger than the first threshold THD1 and the first decision error 'abs (quan_err3_vec(k))' is larger than the second threshold THD2.

Alternatively, the method 400 further comprises (not shown in the drawings) calculating a first difference between the first decision error 'quan_err3_vec(k)' and a next error 'quan_err3_vec(k+1)' of the first decision error 'quan_err3_vec(k);' calculating a second difference between the first decision error 'quan_err3_vec(k)' and a previous error 'quan_err3_vec(k−1)' of the first decision error 'quan_err3_vec(k)'; determining whether both the first difference 'quan_err3_vec(k)−quan_err3_vec(k+1)' and the second difference 'quan_err3_vec(k−1)−quan_err3_vec(k)' are smaller than a third threshold; wherein outputting the second closest constellation point as the corrected symbol further comprises outputting the second closest constellation point as the corrected symbol corresponding to the first decision error if all of the following conditions are satisfied:

a) both the absolute value of the first variance error signal 'abs(quan_err2)' and the absolute value of the second variance error signal 'abs(quan_err21)' are larger than the first threshold 'THD1,' b) the absolute value of the first decision error 'abs (quan_err3_vec(k))' is larger than the second threshold 'THD2,' and c) both the first difference 'quan_err3_vec(k)−quan_err3_vec(k+1)' and the second difference 'quan_err3_vec(k−1)−quan_err3_vec(k)' are smaller than the third threshold.

Figure 5:
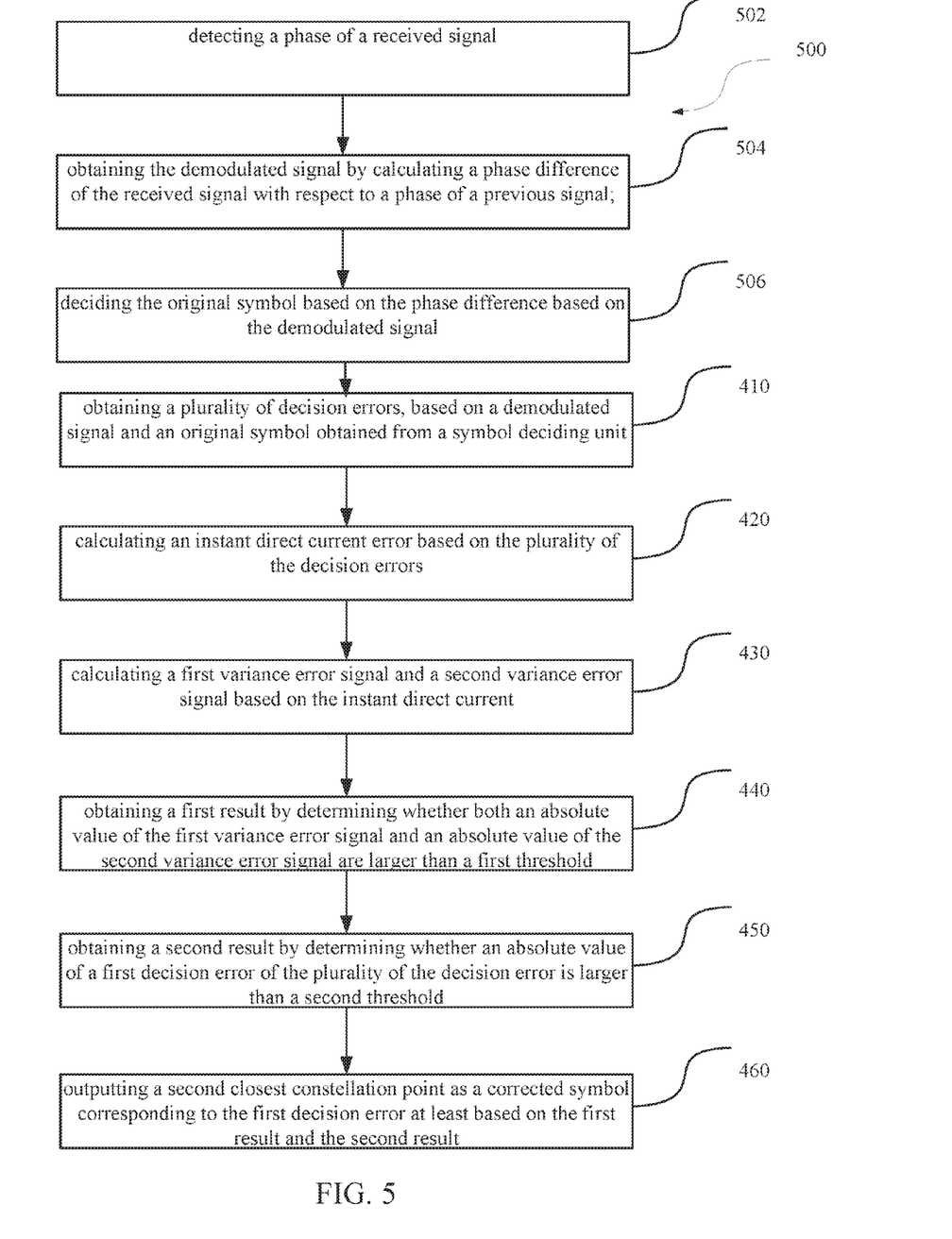
FIG. 5 is a flow chart of a method of making decisions based on phase errors.

FIG. 5 is a flow chart of a method 500 of making decisions based on phase errors. Alternatively, before obtaining the plurality of decision errors, the method 500 further comprises: detecting, in block 502, a phase of a received signal; obtaining, in block 504, the demodulated signal 'S' by calculating a phase difference of the received signal with respect to a phase of a previous signal; deciding, in block 506, the original symbol 'X' based on the phase difference based on the demodulated signal. Blocks 410,420, 430, 440, 450 and 460 in FIG. 5 are respectively the same as blocks 410,420, 430, 440, 450 and 460 in FIG. 4, and their descriptions are omitted.

Alternatively, calculating the instant direct current error 'err_dc' based on the plurality of the decision errors 'quan_err3_vec(k), k=0, 1, 2 . . . n' is implemented by averaging the plurality of the decision errors 'quan_err3_vec (k), k=0, 1, 2 . . . n.'

Alternatively, calculating the first variance error signal further comprises calculating a first average of the first decision error 'quan_err3_vec(k)' and a previous error '(quan_err3_vec(k−1)' of the first decision error 'quan_err3_vec(k)'; calculating a difference between the first average '(quan_err3_vec(k−1)+quan_err3_vec(k))/2' and the instant direct current error 'err_dc'; and calculating the second variance error signal further comprises calculating a second average of the first decision error '(quan_err3_vec(k)' and a next error of the first decision error 'quan_err3_vec(k+1))/2'; and calculating a difference between the second average and the instant direct current error 'quan_err21=(quan_err3_vec(k)+quan_err3_vec(k+1))/2−err _dc.'

Embodiments of the invention utilize the DPSK demodulated signal structure to detect the error symbol, and perform error correction, thus improve the sensitivity of receivers.

It should be appreciated by those skilled in the art that components from different embodiments may be combined to yield another technical solution. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A circuit comprising:
   a decision unit, configured to obtain a plurality of quantized decision errors based on a demodulated signal and an original symbol;
   a calculator configured to
      calculate an instant direct current error based on the plurality of the quantized decision errors;
      calculate a first variance error signal and a second variance error signal based on the instant direct current error;
   an error detector configured to
      obtain a first result by determining whether both an absolute value of the first variance error signal and an absolute value of the second variance error signal are larger than a first threshold;
      obtain a second result by determining whether an absolute value of a first decision error of the plurality of the quantized decision error is larger than a second threshold; and
      output a second closest constellation point with respect to the demodulated signal as a corrected symbol corresponding to the first decision error at least based on the first result and the second result;
   wherein the circuit further comprises
      a phase detector configured to detect a phase of a received signal;
      a phase differentiator configured to obtain the demodulated signal by calculating a phase difference of the received signal with respect to a phase of a previous received signal; and
      the decision unit is further configured to decide the original symbol based on the demodulated signal.

2. The circuit of claim 1, wherein the error detector is further configured to output the second closest with respect to the demodulated signal constellation point as the corrected symbol corresponding to the first decision error if both the absolute value of the first variance error signal and the absolute value of the second variance error signal are larger than the first threshold and the first decision error is larger than the second threshold.

3. The circuit of claim 1, wherein
   the calculator is further configured to
      calculate a first difference between the first decision error and a next error of the first decision error;
      calculate a second difference between the first decision error and a previous error of the first decision error; and
   the error detector is further configured to
      determine whether both the first difference and the second difference are smaller than a third threshold; and
      output the second closest constellation point with respect to the demodulated signal as the corrected symbol corresponding to the first decision error if all of the following conditions are satisfied:
         both the absolute value of the first variance error signal and the absolute value of the second variance error signal are larger than the first threshold, the absolute value of the first decision error is larger than the second threshold, and
         both the first difference and the second difference are smaller than the third threshold.

4. The circuit of claim 1, wherein
   the calculator is further configured to calculate the instant direct current error based on the plurality of the quantized decision errors by averaging the plurality of the quantized decision errors.

5. The circuit of claim 1,
   wherein the calculator is further configured to
      calculate a first average of the first decision error and a previous error of the first decision error;
      obtaining the first variance error signal by calculating a difference between the first average and the instant direct current error;
      calculate a second average of the first decision error and a next error of the first decision error; and
      obtaining the second variance error signal by calculating a difference between the second average and the instant direct current error.

6. A method comprising:
   obtaining a plurality of quantized decision errors, based on a demodulated signal and an original symbol obtained from a symbol deciding unit;
   calculating an instant direct current error based on the plurality of the quantized decision errors;
   calculating a first variance error signal and a second variance error signal based on the instant direct current error;
   obtaining a first result by determining whether both an absolute value of the first variance error signal and an absolute value of the second variance error signal are larger than a first threshold;
   obtaining a second result by determining whether an absolute value of a first decision error of the plurality of the quantized decision error is larger than a second threshold; and
   outputting a second closest constellation point with respect to the demodulated signal as a corrected symbol corresponding to the first decision error at least based on the first result and the second result;
   wherein before obtaining the plurality of quantized decision errors, the method further comprises:
      detecting a phase of a received signal;
      obtaining the demodulated signal by calculating a phase difference of the received signal with respect to a phase of a previous received signal;
      deciding the original symbol based on the demodulated signal.

7. The method of claim 6, wherein outputting the second closest constellation point with respect to the demodulated signal as the corrected symbol further comprises outputting the second closest constellation point with respect to the demodulated signal as the corrected symbol corresponding to the first decision error if both the absolute value of the first variance error signal and the absolute value of the second variance error signal are larger than the first threshold and the first decision error is larger than the second threshold.

8. The method of claim 6, further comprising
   calculating a first difference between the first decision error and a next error of the first decision error;
   calculating a second difference between the first decision error and a previous error of the first decision error;
   determining whether both the first difference and the second difference are smaller than a third threshold;

wherein outputting the second closest constellation point with respect to the demodulated signal as the corrected symbol further comprises outputting the second closest constellation point with respect to the demodulated signal as the corrected symbol corresponding to the first decision error if all of the following conditions are satisfied:

both the absolute value of the first variance error signal and the absolute value of the second variance error signal are larger than the first threshold, the absolute value of the first decision error is larger than the second threshold, and both the first difference and the second difference are smaller than the third threshold.

9. The method of claim 6, wherein calculating the instant direct current error based on the plurality of the quantized decision errors is implemented by averaging the plurality of the quantized decision errors.

10. The method of claim 6, wherein calculating the first variance error signal further comprises calculating a first average of the first decision error and a previous error of the first decision error;

calculating a difference between the first average and the instant direct current error;

wherein calculating the second variance error signal further comprises calculating a second average of the first decision error and a next error of the first decision error; and calculating a difference between the second average and the instant direct current error.

* * * * *